(12) United States Patent
Bettencourt

(10) Patent No.: US 6,319,446 B1
(45) Date of Patent: Nov. 20, 2001

(54) METHOD OF PRODUCING REPLACEABLE MOLD CAVITIES AND MOLD CAVITY INSERTS

(75) Inventor: Alan C. Bettencourt, Solana Beach, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/695,796

(22) Filed: Oct. 23, 2000

Related U.S. Application Data

(63) Continuation of application No. 09/310,785, filed on May 12, 1999, now Pat. No. 6,171,091.

(51) Int. Cl.[7] .................................................. B29C 33/40
(52) U.S. Cl. ............................ 264/225; 249/102; 425/116
(58) Field of Search ................................. 29/527.1, 527.3; 264/220, 225, 266, 267; 249/102; 425/116, 412

(56) References Cited

U.S. PATENT DOCUMENTS

| | | | |
|---|---|---|---|
| 2,388,776 | * | 11/1945 | Wallace . |
| 3,308,223 | * | 3/1967 | Hoppes ................................. 264/220 |
| 3,867,078 | * | 2/1975 | Porter ....................................... 425/78 |
| 4,552,004 | * | 11/1985 | Barfield et al. ........................... 72/60 |
| 5,530,227 | * | 6/1996 | Matsen et al. ........................ 264/403 |
| 5,984,807 | * | 11/1999 | Wai et al. ............................. 264/241 |

\* cited by examiner

*Primary Examiner*—Robert Davis
(74) *Attorney, Agent, or Firm*—Michael A. Catania

(57) ABSTRACT

A replaceable mold cavity for use in the production of golf balls is disclosed herein. The mold cavity has a plastic insert with an inverse dimple pattern thereon that is formed from a plastic molding material, and a support cup in which the plastic insert is placed for the golf ball molding operation. The plastic insert may have a metal layer thereon that has an identical inverse dimple pattern. The entire replaceable mold cavity may also be composed of a plastic material. The use of plastic molding materials to form the plastic insert, or the entire mold cavity, allows for rapid production of golf balls having different dimple patterns which allows for expedited testing and introduction of new golf balls.

3 Claims, 7 Drawing Sheets

METHOD OF PRODUCING REPLACEABLE MOLD CAVITIES AND MOLD CAVITY INSERTS

CROSS REFERENCES TO RELATED APPLICATIONS

This application is a continuation application of U.S. patent application Ser. No. 09/310,785, filed on May 12, 1999 and now U.S. Pat. No. 6,171,091.

STATEMENT REGARDING FEDERALLY SPONSORED RESEARCH OR DEVELOPMENT

Not Applicable

BACKGROUND OF THE INVENTION

1. Field of the Invention

The present invention relates to mold cavities and mold cavity inserts made of polymers, metals, and combinations thereof, that can be used in a variety of molding applications, while being particularly suited for applications demanding fine mold reproduction, as well as expedient and cost-effective mold cavity interchangeability. More specifically, the present invention relates to mold cavities and mold cavity inserts for golf ball manufacturing.

2. Description of the Related Art

Mold cavities are used to manufacture the dimpled cover portions of golf balls. Until the present invention, mold cavities used for making the dimpled cover portions of golf balls have been made of metal. The shapes, dimensions, and pattern of the dimples on a golf ball significantly contribute to the aerodynamic performance of the ball as shown by windtunnel testing and performance testing using robots and golfers. For this reason, golf ball manufacturers routinely experiment with varieties of new and different dimple patterns, shapes, and sizes, in order to arrive at designs that enhance golf ball performance. Achieving the desired aerodynamic performance properties requires the ability to produce such dimensions, shapes, and patterns consistently with careful attention to producing uniform geometry and dimensions across the dimples for a given ball design. As a result, there is a demand in the golf ball industry for producing intricate and novel dimple shapes and patterns with the ability to consistently, accurately, and reliably reproduce such designs. Because a golf ball receives its dimples from a mold cavity, the integrity and characteristics of the dimples formed on the golf ball are dependent upon the accuracy of the mold cavity from which the dimples are formed.

While it is important that precise and well-formed golf ball mold cavities be available for manufacturing golf balls, it is also desirable that golf ball manufacturers have the ability to quickly test and evaluate golf balls exhibiting new and different dimple patterns and features which, necessarily, requires the ability to quickly form the mold cavities used in their creation.

In addition to producing golf balls with different dimple patterns quickly, a golf ball manufacturer may also want to evaluate numerous dimple patterns at the same time. This requires not only that the mold cavities used in their creation be formed quickly, but also that the mold cavities be formed in a cost-effective manner. Further, mold cavities that are less expensive to produce and that are conveniently replaceable or interchangeable, allow greater flexibility and improved cost control in producing prototype golf balls for testing as well as in larger scale golf ball production for sale.

Typically, the dimpled cover portion of a golf ball is made using a molding process such as injection molding, compression molding or casting. Commonly, two oppositely facing mold halves are used, an upper mold half and a lower mold half, with each mold half having a hemispherical, inversely dimpled mold cavity formed out of metal. Each mold half is approximately one half of the size of a finished ball. It is an industry standard to make inversely dimpled mold cavities used for making golf balls out of metal, typically stainless steel. Harder metals, like stainless steel, are chosen primarily because of their durability, mechanical strength, and ability to withstand higher pressures and temperatures without deforming. When the two mold halves are put together they form an internal cavity that is generally spherical with an inversely dimpled pattern representing the negative image of the dimple pattern that will be produced on the golf ball formed therein. U.S. Pat. No. 4,552,004 describes this process and also describes typical methods used for forming golf ball mold cavities, namely hobbing, die-forming, and a high-pressure hydraulic press method. Notably, though, there are significant drawbacks and limitations associated with each of these methods and the mold cavities they produce.

As described in U.S. Pat. No. 4,552,004, the disadvantage of hobbing is that the metal used to make the mold must be very soft in order to flow well enough to adequately conform to the hob. Further a mold made by hobbing has a short useful life because it is soft and susceptible to deformation and damage when manufacturing loads are applied. Also as described in U.S. Pat. No. 4,552,004, while the die-forming process for making golf ball molds has the advantage of being able to utilize harder metals like stainless steel, and thereby providing greater durability, the dimples formed are generally less accurate than those made by hobbing. Less accuracy in dimple formation is disadvantageous because it causes greater variation in the dimples produced from mold to mold which effects the aerodynamics of a golf ball.

The high-pressure hydraulic press method disclosed in U.S. Pat. No. 4,552,004 is designed for making mold cavities out of hard metals (due to the extreme pressures involved) with the aim of providing durability advantages similar to those found in die-forming. However, a disadvantage in using the high-pressure hydraulic press method is that the dimpled master model (resembling the dimple pattern of the golf ball to be formed) upon which the inversely dimpled mold cavity shell is formed, must be of an extremely hard metal (for example, pre-hardened steel) in order to resist deformation under the extreme pressure applied. U.S. Pat. No. 4,552,004 indicates that generally the required pressure will be in excess of 100,000 p.s.i. A significant disadvantage in using a dimpled master model made of a very hard metal is that it takes much longer to machine a very hard metal compared to softer materials. It can take sixteen hours or more to machine a dimpled master model made of HD-13 pre-hardened steel. In addition, the tool bits used to machine such a hard metal must be of very high quality and durability, making them expensive. It is typical to consume several tool bits for each dimpled master model made, as they wear out during the machining process.

Once an inversely dimpled mold cavity shell is formed, it is typical in the industry to then braze the mold cavity shell into a metal retaining cup which provides support and acts to hold the mold cavity shell in place during golf ball molding. The inversely dimpled mold cavity shell then undergoes a machining finish and polishing process. The brazing, finishing, and polishing process typically takes about three hours to complete. Two of these inversely dimpled mold cavity shell and retaining cup assemblies are then aligned opposite one another in a mold base and when the two are closed, they form a substantially spherical cavity used to mold a golf ball.

It is common in the golf ball industry for golf ball manufacturers to order inversely dimpled mold cavity shell and retainer cup assemblies made of steel (or other metals) from machine shops that support the industry. Typically a computer-aided-design (CAD) dimple pattern model is provided to a machine shop and a lead-time of ten weeks or more is typical before the mold cavity shell and retainer cup assemblies are received.

The extended amount of time required by using presently known techniques for obtaining golf ball mold cavities (especially for testing and prototyping when many designs are being considered and when designs are changing rapidly) is a bottleneck for manufacturers interested in bringing new designs to market rapidly. Further, production molding is more expensive and flexibility is limited by the presently known techniques utilizing metal mold cavity inserts that are brazed into metal retaining cup housings. The presently known methods prevent mold cavity inserts from being removed from a production line without removing the retaining cup housings as well, and metal components are generally more expensive to make than plastic components.

Therefore, a need exists for replaceable mold cavities and mold cavity inserts that can be produced less expensively and more rapidly than the presently known techniques for making golf ball mold cavities. The replaceable mold cavities and mold cavity inserts must also provide the requisite exactness and uniformity in dimple size, shape, and pattern and provide the strength and durability characteristics required during the elevated temperatures and pressures commonly used during golf ball molding.

BRIEF SUMMARY OF THE INVENTION

The present invention provides replaceable, plastic, mold cavities and mold cavity inserts for producing prototype and production golf balls, and more generally, for producing articles in any application requiring fine mold reproduction. The present invention further provides methods of making such mold cavities and mold cavity inserts and methods of making golf balls using such inserts. In addition, the present invention includes replaceable mold cavities and mold cavity inserts made of combinations of plastic and metal, methods of their manufacture and methods of their use in producing prototype and production golf balls.

One aspect of the present invention is a method for producing a replaceable mold cavity insert for a golf ball. The method includes mating a master with a recess. The recess contains a plastic molding material, and the master has a predetermined dimple pattern for a golf ball. The master is attached to a first plate of a mold and the recess is attached to a second plate of the mold. The plastic molding material is molded to form a plastic insert having an inverse dimple pattern of the golf ball. The plastic molding material may be compression molded or injection molded to form the plastic insert.

Another aspect of the present invention is a replaceable mold cavity for a golf ball. The replaceable mold cavity includes a support cup having a recess, and a plastic insert having a concave surface with an inverse dimple pattern of a golf ball. The plastic insert is disposed in the recess of the support cup.

Another aspect of the present invention is an apparatus for producing a replaceable mold cavity for a golf ball. The replaceable mold cavity includes a plastic insert produced from a plastic molding material. The apparatus includes a first plate, a second plate and a heating and pressure mechanism. The first plate has a master thereon, and the master has a predetermined dimple pattern for a golf ball. The second plate has a recess therein, and the recess opposes the master. The recess has a volume greater than the volume of the master for containing the plastic molding material. The heating and pressing mechanism heats and presses the first and second plates together to form the plastic insert from the plastic molding material.

It is an object of the present invention to provide a replaceable mold cavity for producing a golf ball.

It is an additional object of the present invention to provide a method and apparatus for forming a replaceable mold cavity for producing a golf ball.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The Present Invention provides for the rapid prototyping of golf balls which allows a manufacturer of golf balls to expedite testing of different golf ball dimple patterns, or review a greater number of different golf ball dimple patterns in a given time period. This rapid prototyping is accomplished by molding all or a portion of a replaceable mold cavity from a plastic molding material. Preferably, the plastic is one that exhibits rapid cure time, and upon curing exhibits durability, low wear resistance, and high mechanical strength, particularly at elevated temperatures and pressures. The plastic should also exhibit low and predictable shrinkage during curing. Shrinkage is considered low if it is on the order of 0.1% to 0.2%, or lower. Preferable plastics include thermosetting plastic resins and thermoplastic resins. Examples of thermosetting resins include phenolics, epoxies, and polyesters. Examples of thermoplastic resins include polyetherimide, polyethersulfone, polyetherketone, polyetheretherketone, and polyamide-imide. The plastics may also be reinforced with filler materials for added strength, increased heat transfer and/or improved ball release properties. Examples of filler materials include glass, mineral, Teflon, and graphite. A preferred plastic is a phenolic plastic resin with filler materials, such as Cytec Fiberite Molding Compound FM-4029F-1 (phenolic resin with glass and mineral fillers) available from Cytec Fiberite, Inc. Cytec Fiberite's FM-4029F-1 has been found to exhibit rapid cure time, excellent mold reproduction characteristics, and excellent mechanical strength and durability during golf ball molding temperatures and pressures.

Figure 1:
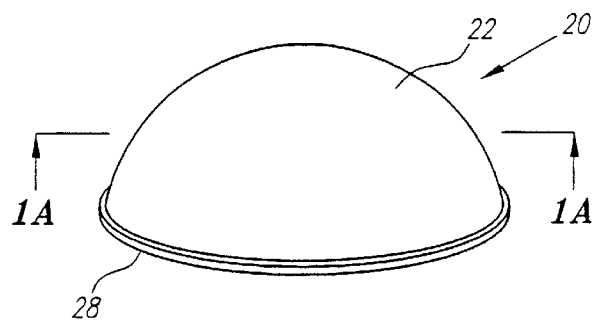
FIG. 1 is a perspective view of a mold cavity plastic insert of the present invention.
Figure 1A:
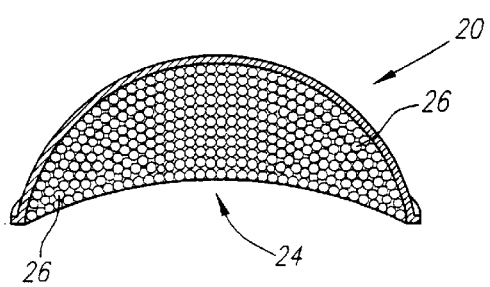
FIG. 1A is a cross-sectional view of the mold cavity plastic insert of FIG. 1 taken along line A—A.

As shown in FIGS. 1 and 1A, a plastic insert for a replaceable mold cavity is generally designated 20. As used herein, the term "plastic insert" includes inserts composed of thermosetting resins and thermoplastic resins. The plastic insert 20 is essentially hemispherical in shape having a convex exterior surface 22 and a concave interior surface 24. The concave interior surface 24 has an inverse dimple pattern 26 that is used to mold a predetermined dimple pattern on a cover of a golf ball. The opening of the plastic insert 20 is defined by a flange 28. The plastic insert 20 may be composed of any of the plastic molding materials described above.

Figure 2:
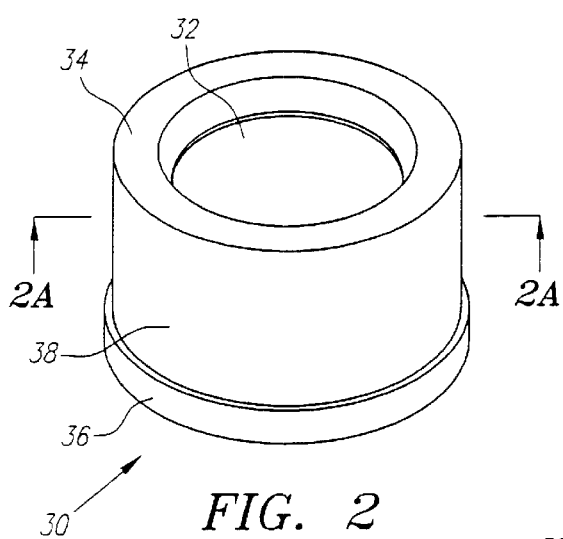
FIG. 2 is a perspective view of a support cup of the present invention.
Figure 2A:
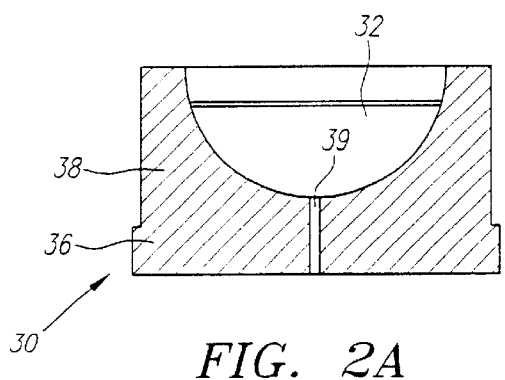
FIG. 2A is a cross-sectional view of the support cup of FIG. 2 taken along line A—A.

As shown in FIGS. 2 and 2A, a support cup for the replaceable mold cavity is generally designated 30. The support cup 30 has a substantially hemispherical recess 32 that may be used to retain and support the plastic insert 20 during golf ball molding. The recess 32 is defined by a perimeter 34 of a cylindrical body 38. The perimeter 34 is used to assist in aligning and securing the supporting cup 30 into a mold base, and the perimeter 34 may have an annular groove 37 therein. The cylindrical body 38 rests on a base 36. A vent hole 39 is positioned at the bottom of the recess 32, and the vent hole 39 transverses the base 36 allow for access to the recess 32 from the bottom of the support cup 30. In a preferred embodiment, the support cup 30 is composed of a stainless steel material. However, the support cup 30 may be composed of other metals as well as other rigid materials that are capable of withstanding a golf ball molding operation.

Figure 3:
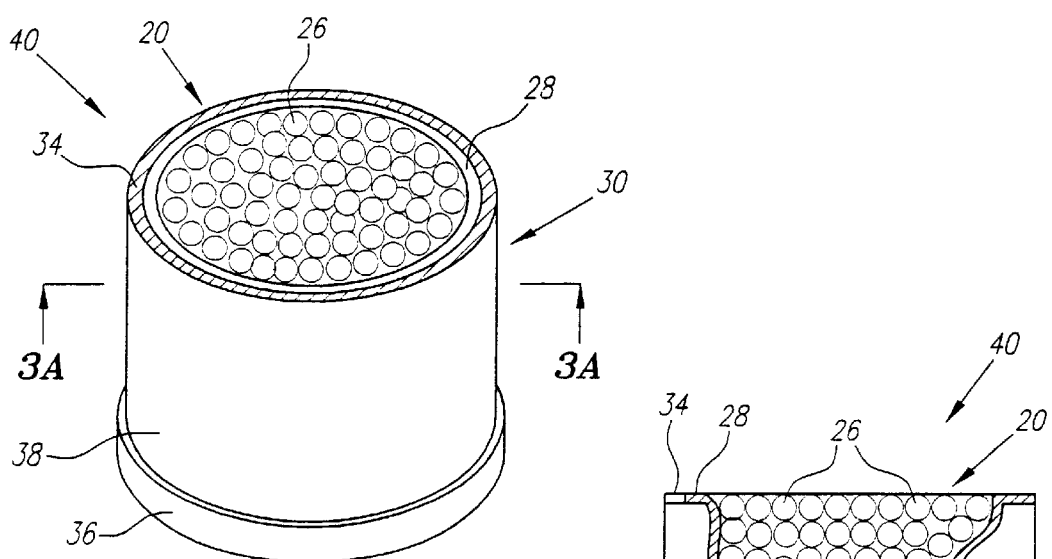
FIG. 3 is a top perspective view of a replaceable mold cavity of the present invention with the plastic insert disposed in the support cup.
Figure 3A:
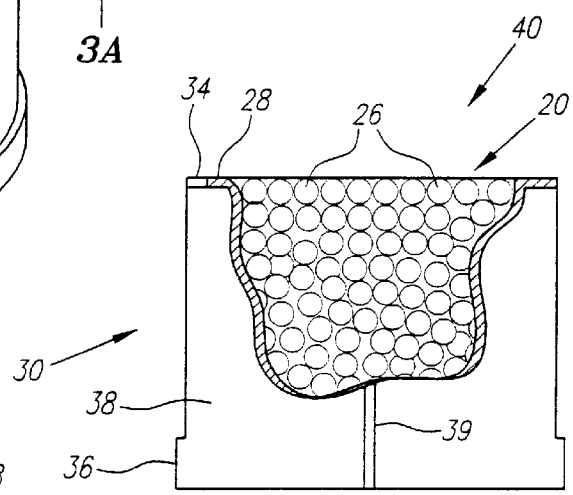
FIG. 3A is a cross-sectional view of the replaceable mold cavity of FIG. 3 taken along line A—A.

As shown in FIGS. 3 and 3A, a replaceable mold cavity 40 generally includes the plastic insert 20 and the support cup 30. More precisely, the replaceable mold cavity 40 is half of a mold cavity, and a substantially exact duplicate is mated with the mold cavity 40 to form a complete mold cavity for molding a golf ball. The plastic insert 20 rests within the recess 32 with the flange 28 lying in the annular groove 37, not shown. The perimeter 34 of the support cup 30 and the perimeter 28 of the plastic insert 20 are concentric providing for a flat top of the replaceable mold cavity 40. The plastic insert 20 may be fixed to the supporting cup 30 using an adhesive or other bonding agent sufficient to hold the plastic insert 20 in place under golf ball molding conditions, temperatures and pressures.

Alternatively, in addition to or instead of using an adhesive or bonding agent, frictional and mechanical locking mechanisms may also be used to align and fix the plastic insert 20 to the supporting cup 30. The annular groove 37 is adapted to receive and frictionally engage the flange 28 of the plastic insert 20. Other embodiments may have a retainer plate, not shown, that serves to mechanically engage the flange 28 and thereby retain the plastic insert 20 to the supporting cup 30. Those skilled in the art will recognize that other means may be utilized to maintain the plastic insert 20 in the support cup 30 without departing from the scope and spirit of the present invention. Further, when the plastic insert 20 is no longer needed, the rod directed through the vent hole 39 might be used to eject the plastic insert 20 from the support cup 30.

Figure 4:
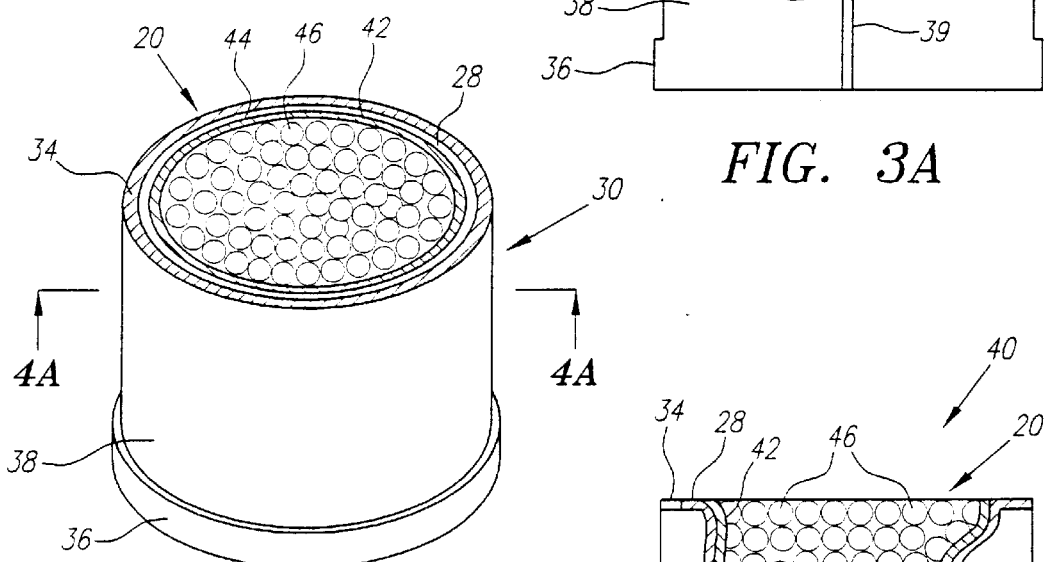
FIG. 4 is a top perspective view of a replaceable mold cavity of the present invention with the plastic insert disposed in the support cup, and a metal layer on the plastic insert.
Figure 4A:
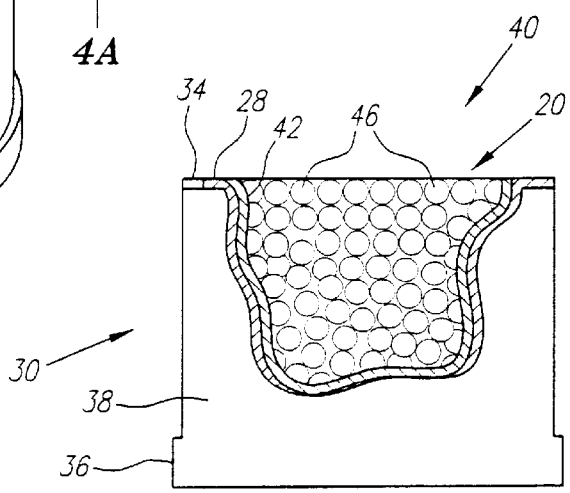
FIG. 4A is a cross-sectional view of the replaceable mold cavity of FIG. 4 taken along line A—A.

Another embodiment of a replaceable mold cavity 40 is illustrated in FIGS. 4 and 4A. In this embodiment, a metal layer 42 is disposed on the concave surface 24 of the plastic insert 20. The metal layer 42 has a substantially concave surface 46 having an inverse dimple pattern identical with the underlying inverse dimple pattern of the plastic insert 20. The metal layer 42 has an edge 44 that is concentric with the flange 28 and the perimeter 34 to create a smooth top portion of the replaceable mold cavity 40. The metal layer 42 may be composed of stainless steel, steel, nickel, titanium, chromium, aluminum, zinc, magnesium, copper, or alloys of any of the above, alone or in combination. Preferably, the metal layer 42 is composed of a stainless steel. The metal layer 42 facilitates the demolding of a golf ball and allows for the use of Teflon-based mold release agents as further described below. Additionally, the metal layer 42 increases the strength of the replaceable mold cavity 40.

The metal layer 42 may be formed using a variety of techniques, including but not limited to vapor deposition, electrodeposition, compression molding, high pressure hydraulic press molding, injection molding, or diecast molding. Some of these techniques may be preferable to others depending upon the metal or metals used, and upon the desired thickness of the metal layer 42. Vapor deposition, electrodeposition, and compression molding techniques may be preferable when the desired metal layer 42 is relatively thin (for example, between 0.001 and 0.010 inches) whereas high pressure hydraulic press, injection, or diecast molding may be preferable when the desired metal layer 42 is thicker. The metal layer 42 may be deposited on a formed plastic insert 20 as further described below. Alternatively, the metal layer 42 may be formed simultaneously with the plastic insert 20 as further described below. Yet further, the metal layer 42 may be formed separately and attached to the plastic insert 20 as further described below. Depending on the process, the convex surface of the metal layer 42 may be mechanically or chemically fixed to the concave surface 24 of the plastic insert 20. Preferably, a suitable chemical bonding agent or adhesive is utilized to fix the metal layer 42 to the plastic insert 20. Alternatively, depending upon the specific metal and the plastic molding material used, mechanical bonding between the plastic portion and the metal portion may be sufficient so that use of a chemical bonding agent or adhesive is not necessary.

Figure 5:
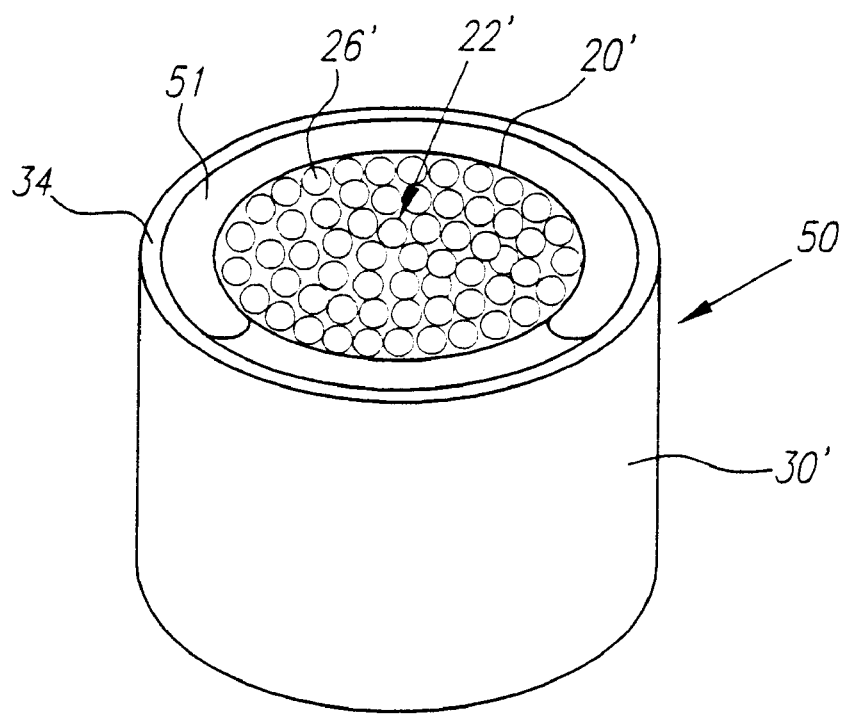
FIG. 5 is a top perspective of a replaceable mold cavity of the present invention in which the plastic insert is integral with the support cup which is also formed from plastic.

Yet another embodiment of the present invention is illustrated in FIG. 5. As shown in FIG. 5, a one-piece replaceable mold cavity is generally designated 50. In this embodiment, the support cup 30' and the plastic insert 20' are integral and both formed from a plastic molding material. The perimeter 34 of the support cup 30' has an annular groove 51 for locking with a corresponding replaceable mold cavity 50 during fabrication of a golf ball, and for receiving excess cover material during the fabrication of a golf ball. The one-piece replaceable mold cavity 50 lessens the production time even further since it eliminates the need for bonding the plastic insert 20 to the support cup 30. Further, those skilled in the art will recognize that a metal layer 42, as shown in FIGS. 4 and 4A, may be included with the one-piece replaceable mold cavity 50 using any of the previously mentioned techniques.

Figure 6:
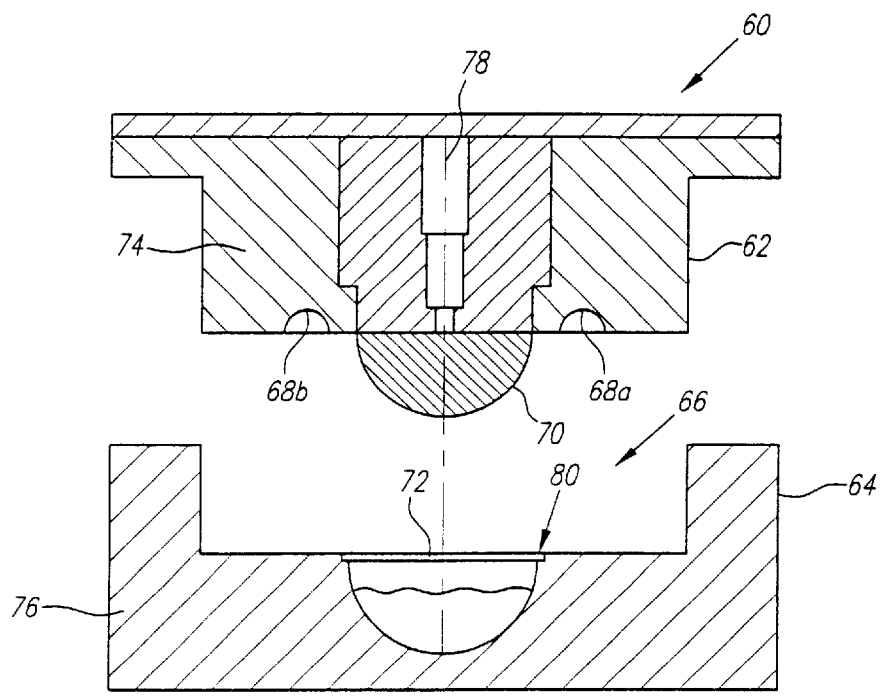
FIG. 6 is a cross-sectional view of a mold utilized for producing the plastic insert of the present invention.
Figure 7:
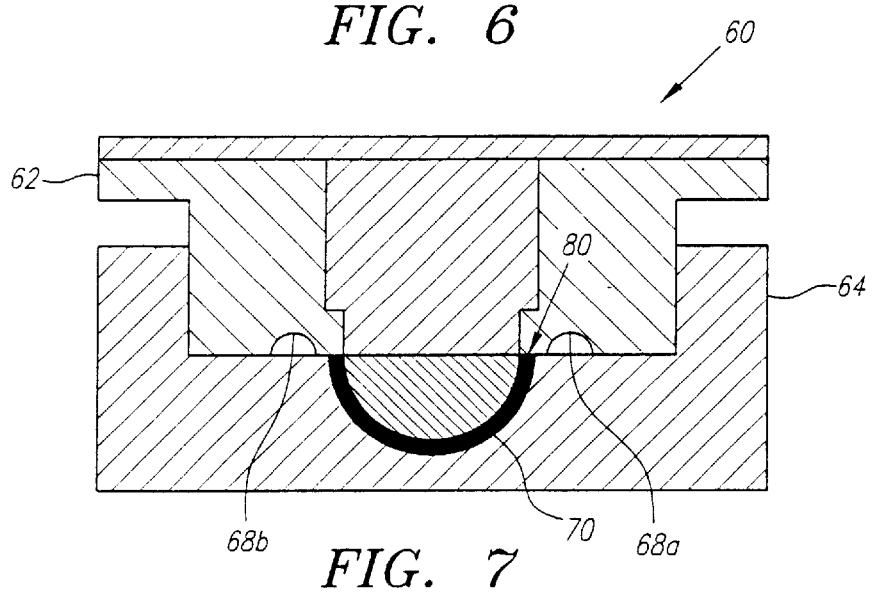
FIG. 7 is a cross-sectional view of the mold of FIG. 6 in a closed state, as opposed to the open state of FIG. 6.
Figure 8:
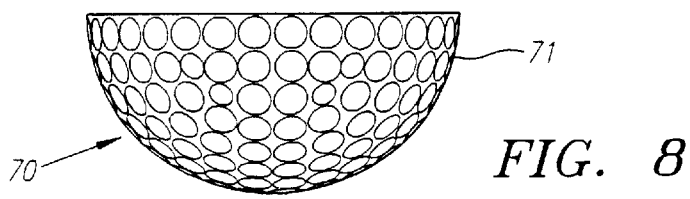
FIG. 8 is a perspective view of a master utilized to form the plastic insert of the present invention.

The fabrication of the various embodiments of the replaceable mold cavity of the present invention are illustrated in FIGS. 6–12, and described below. As shown in FIGS. 6, 7 and 9–12 a mold apparatus for forming the various aspects of the replaceable mold cavity 40 and 50, is generally designated 60. The mold 60 includes a first plate 62 and a second plate 64, the plates 62 and 64 opposing each other. The first plate 62 has a main body 74 with a plurality of overflow outlets 68a–b disposed on an opposing surface 73 of the main body 74. The second plate 64 has a main body 76 and a receptacle 66 for receiving the main body 74 of the first plate 62 during the molding operation. The first plate 62 has a master 70 projecting from the opposing surface 73. As shown in FIG. 8, the master 70 has a predetermined dimple pattern 71 that models the desired dimple pattern for the golf ball that will ultimately be produced. During the molding operation, the master 70 is mated with a recess 72 disposed within the main body 76 of the second plate 64. The master 70 is held on the first plate 62 by a holding mechanism 78 which may be a threaded bolt projecting through the center of the main body 74.

In a preferred embodiment for making a plastic insert 20 of the present invention, the mold 60 is heated to about 350° F. Preferably, prior to initial heating, a dry film mold release such as McLube Mac 444A Colorless Dry Film Mold Release is applied to the dimple pattern 71 of the master 70 by aerosol spraying. Other suitable mold release agents and application methods may similarly be used. Initially, the first plate 62 and the second plate 64 of the mold 60 are separated in an open state, as shown in FIG. 6. A plastic molding material 80, preferably a plastic in solid powdered form, is placed into the recess 72 of the second plate 64 and begins to liquefy. In a preferred embodiment, approximately 26 to 30 grams of Cytec Fiberite Molding Compound FM-4029F-1, a phenolic resin based plastic molding material 80 in solid powdered form, is introduced into the recess 72 to fabricate the plastic insert 20 of the present invention. While a plastic molding material in solid powdered form is described, those skilled in the pertinent art will recognize that a solid pill-like form, a gel-like form, liquid form, or other suitable forms may be used to practice the present invention. If desirable, another coating of mold release agent may be applied to the dimple-pattern 71 of the master 70 before the first and second plates 62 and 64 of the mold 60 are mated to a closed state. As shown in FIG. 7, the first plate 62 of the mold 60 is mated with second plate 64 of the mold 60. More specifically, a portion of the main body 74 is placed within the receptacle 66 allowing for the master 70 to be mated with the recess 72. There is approximately 30 seconds of preheating time measured from the time the plastic molding material 80 is introduced into the recess 72 of the second plate 64 until the mold 60 is closed and placed into a compression molding press 90. In the case of a thermosetting plastic resin molding material, applying heat not only serves to liquefy the material, it also serves to drive a chemical reaction which provides cross-linking and initiates curing of the plastic.

Figure 12:
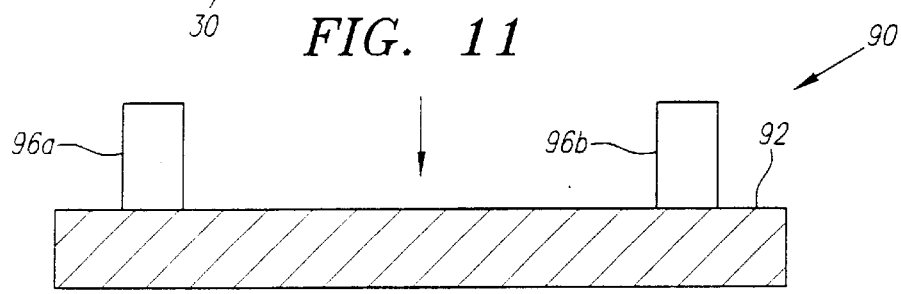
FIG. 12 is a cross-sectional view of a compression press with a mold of the present invention.
Figure 12:
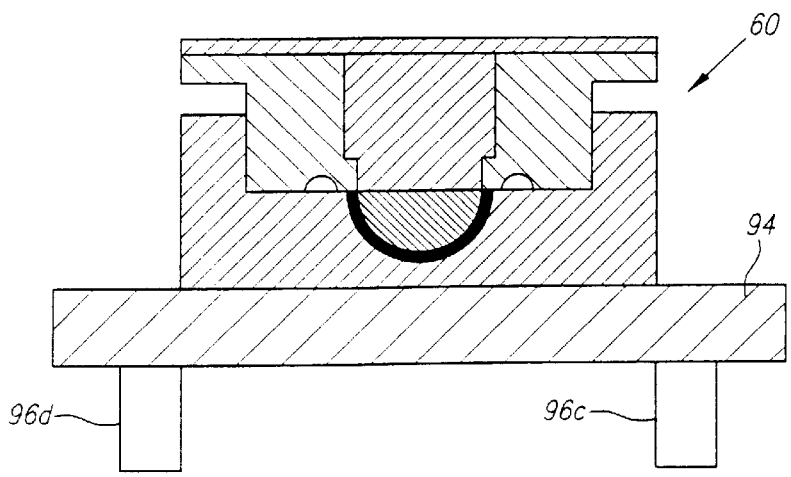

As shown in FIG. 12, heating may be accomplished by placing the mold 60 in a compression molding press 90 having heated platens 92 and 94 that compress and heat the mold 60. The heated platens 92 and 94 are moved toward and away from each other through use of hydraulics 96. After the mold 60 is placed in the compression press 90, pressure is applied to the mold 60 in a range generally between 2000 p.s.i. and 30,000 p.s.i. for approximately three minutes. When the Cytec Fiberite Molding compound FM-4029F-1 is used, the pressure applied is preferably between 20,000 and 30,000 p.s.i., for approximately three minutes. Applying pressure compresses the plastic molding material 80 by pressing the first and second plates 62 and 64 of the mold 60 against each other such that the predetermined dimple pattern 71 of the master 70 presses the plastic molding material 80 against the walls of the recess 72 of the second plate 64, thereby conforming the plastic molding material 80 to the predetermined dimple pattern 71 of the master 70. During the compression process, the walls of the recess 72 act to resist the flow of the plastic molding material 80 and forces the plastic molding material 80 to conform to the predetermined dimple pattern 71 of the master 70. During this process, the plastic molding material 80 cures and a plastic mold cavity insert 20 having a substantially hemispherical shell and an inverse dimple pattern 26 on its concave surface 24 is formed.

The first plate 62 of the mold 60 includes overflow outlets 68a–b designed to receive surplus plastic molding material 80 generated when the first and second plates 62 and 64 are pressed together. It is preferred that the amount of plastic molding material 80 initially introduced into the recess 72 be sufficient to cause slight overflow of the material 80 into the overflow outlets 68a–b during compression to insure that a complete plastic mold cavity insert 20 is formed. While one type of overflow mechanism is shown, those skilled in the art will recognize that other mechanisms for collecting surplus molding material 80 may be utilized in practicing the present invention.

The mold 60 is then removed from the compression press 90, and the first plate 62 of the mold 60 is separated from the second plate 64 of the mold 60. The plastic mold cavity insert 20 formed is often adhered to the dimple-pattern 71 of the master 70. The plastic mold cavity insert 20 may be removed from the master 70 by using any suitable means, including mechanical stripping. The master 70 may include a core section having a drilled and tapped portion that houses a nut and bolt assembly that is linked to the dimple pattern 71. By turning the nut and bolt assembly, the dimple pattern 71 of the master 70 may be retracted through the first plate 71, thereby releasing the formed plastic mold cavity insert 20 from the dimple pattern 71 of the master 70 as the flange 28 of the formed plastic mold cavity insert 20 abuts the first plate 62.

Figure 13:
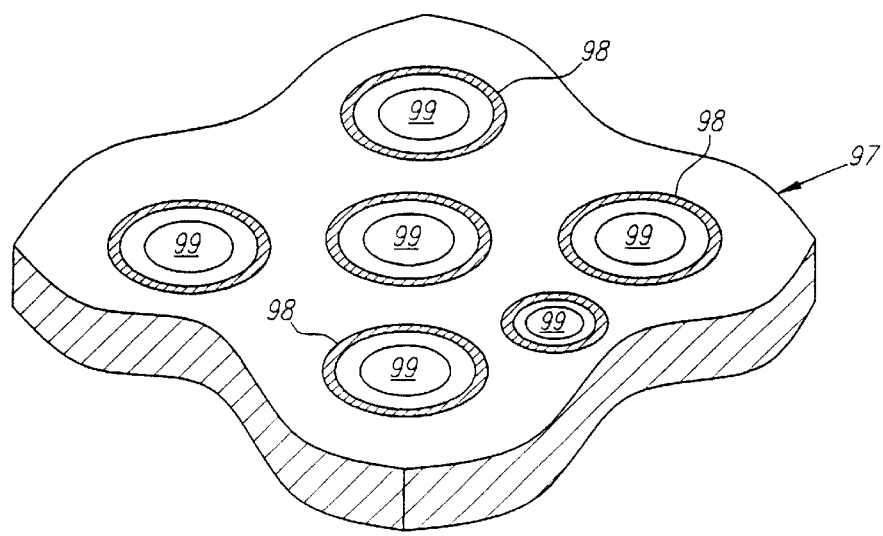
FIG. 13 is a top perspective view of a cast mold utilizing replaceable cavity mold inserts of the present invention.

After the plastic mold cavity insert 20 is removed from the mold 60, excess portions of the insert 20 known as "flash" that are formed during the molding process are removed by trimming, sanding, cutting, filing, or other means. The plastic mold cavity insert 20 is then ready for preparation and implementation into a golf ball molding apparatus 97 as shown in FIG. 13.

Vapor deposition or electrodeposition are two techniques to dispose the metal layer 42 on the plastic insert 20 as shown in FIGS. 4 and 4A. In practicing one of these techniques, the plastic insert 20 is molded from a plastic molding material as described above, using a compression molding press 90 and a mold 60. The metal layer 42 is then formed upon the inverse dimple pattern 26 of the concave surface 24 of the plastic insert 20 using vapor deposition or electrodeposition methods. Such methods are common and well-known for manufacturing metal layers or coatings. Such methods may be preferable when the desired metal layer 42 is relatively thin, on the order of 0.001 to 0.010 in., although greater thickness may also be obtained using such methods. However, as the desired thickness of the metal layer 42 increases, controlling the deposition of the metal particles so that a uniform coating is maintained across the inverse dimple patterned surface portion of the mold cavity insert, may be difficult. As a result, it may be preferable to use an alternative method for creating plastic mold cavity inserts having thicker metal layers 42.

Figure 9:
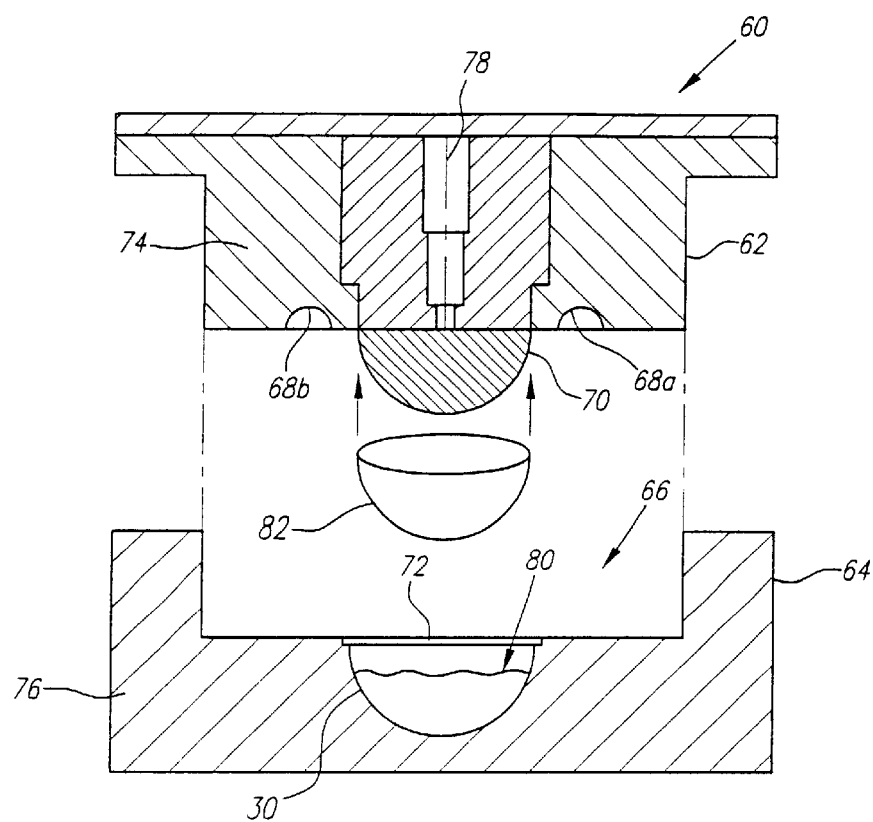
FIG. 9 is a cross-sectional view of a mold utilized to form a plastic insert with a metal layer of the present invention.

In another embodiment of the present invention, a plastic mold cavity insert 20 having a metal layer 42 is made using a compression molding technique. This embodiment is similar to the above-described method for forming a plastic mold cavity insert 20 using compression molding press 90 and a mold apparatus 60, however, an additional step is performed. Prior to molding the plastic molding material 80 by mating the first and second plates 62 and 64 of the mold 60, a substantially hemispherical metal shell 82 is fitted over the dimple pattern 71 of the master 70 as shown in FIG. 9. The metal shell 82 may be fitted over the dimple pattern 71 of the master 70 by friction, use of an adhesive, by vacuum, a combination thereof, or other means. Suitable metals for the metal shell 82 include, stainless steel, steel, nickel, chromium, aluminum, zinc, magnesium, copper, and alloys of any of the above, alone or in combination. Other metals having suitable molding properties may also be used. Depending upon the metal selected for the metal shell 82 and the plastic molding material 80 selected for molding, it may also be desirable to apply a chemical bonding agent to the exterior surface of the metal shell 82 facing opposite the recess 72 the second plate 64 of the mold 60, or to introduce a chemical bonding agent into the recess 72 with the plastic molding material 80. Such a chemical bonding agent may be used to facilitate adherence of the metal shell 82, or metal layer 42, of the formed mold cavity insert to the plastic mold cavity insert 20. Examples of chemical bonding agents that may be used include hot vulcanizing bonding agents such as ChemLok manufactured by Lord Chemical. Use of a chemical bonding agent may be unnecessary if, after molding, there is sufficient mechanical bonding between the plastic insert 20 and metal layer 42.

The molding operation is similar to that described above for the plastic insert 20 by itself. When a stainless steel metal shell 82, up to approximately 0.005 inches thick, is used with the Cytec Fiberite Molding Compound FM-4029F-1, the pressure applied is preferably between 20,000 and 30,000 p.s.i., for approximately three minutes. The pressure that is necessary to apply may vary depending upon the thickness of the substantially hemispherical metal shell 82 that is being used and the type of metal. Thicker and harder metals will generally require that greater pressures be applied. For stainless steel shells of thickness up to 0.005 in., the compression pressure range of between 20,000 and 30,000 p.s.i. is generally sufficient. Applying pressure compresses the metal shell 82 and plastic molding material 80 such that the dimple pattern 71 of the master 70 presses against the substantially hemispherical metal shell 82 which, in turn, presses the plastic molding material against the walls of recess 72 of the second plate 64, thereby conforming the metal shell 82 to the dimple pattern 71 of the master 70. During the compression process, the walls of the recess 72 resists the flow of the plastic molding material 80 and transfers pressure forces back through the plastic molding material 80 to the metal shell 82, forcing the metal shell 82 to conform to the dimple pattern 71 of the master 70. During this process, the plastic molding material 80 cures and a plastic mold cavity insert 20 having a metal layer 42 with an inverse dimple pattern 46 is formed.

The mold 60 is then removed from the compression press 90, and the plates 62 and 64 are separated as described above. The plastic mold cavity insert 20 with the metal layer 42 is often adhered to the master 70, and it may be removed as described above.

After removal from the mold 60, excess metal portions and plastic portions known as "flash" that are formed during the molding process are removed by trimming, sanding, cutting, filing, or other means. The plastic mold cavity insert 20 with the metal layer 42 is then placed in a support cup 30 for preparation and implementation into a golf ball molding apparatus 97, as shown in FIG. 13.

In an alternative embodiment, a plastic mold cavity insert 20 having a metal layer 42 is made by separately forming the metal layer 42 and plastic insert 20, and then later joining them together. The inverse dimple pattern metal layer 42 can be made by methods described herein, including compression molding, high pressure hydraulic press molding, injection molding, or diecast molding. Preferably compression molding or a form of high pressure hydraulic press molding is used, as these methods generally provide better dimple pattern reproduction, and at least in the case of high pressure hydraulic press molding, permit the metal layer 42 to be molded from harder and thicker metals.

After the inverse dimple pattern metal layer 42 is formed, the concave surface of the metal layer 42 may be sprayed with a water-based Teflon mold release agent such as Diamond Kote manufactured by Franklin Industries, and then heated to approximately 650° F. to uniformly glaze the Teflon coating over the surface, allowing it to melt, flow and bond to the metal. The advantage of Teflon mold release agents is their superior mold release properties compared to other mold release agents. The disadvantage is that higher temperatures, on the order of 650° F., are required to properly apply such agents. For that reason, these types of mold release agents cannot be used on mold components made of plastic because they generally cannot tolerate such high temperatures without deforming.

Figure 10:
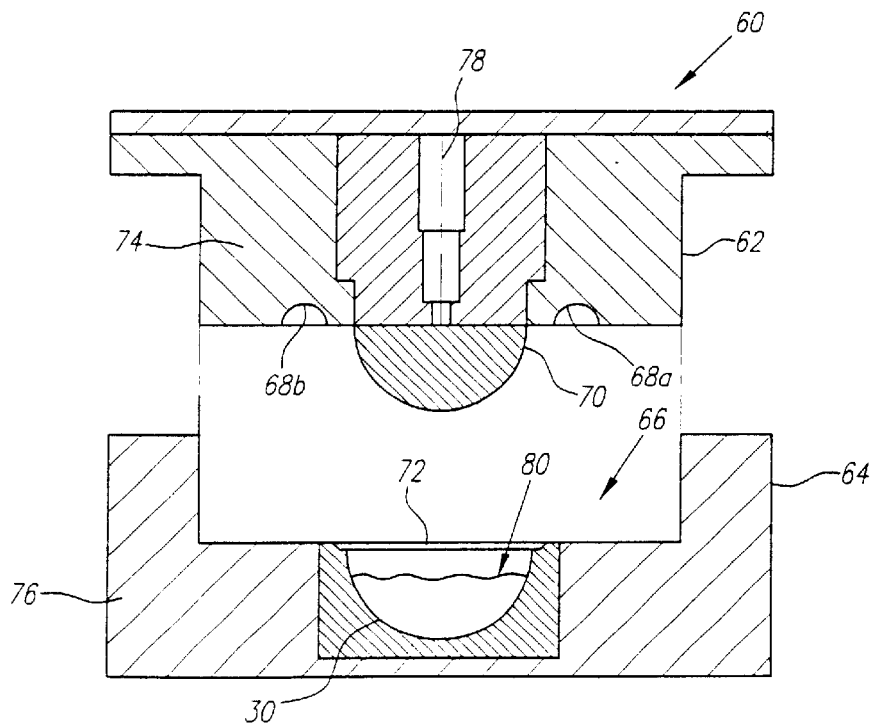
FIG. 10 is a cross-sectional view of a mold, with a supporting cup therein, utilized to form a plastic insert of the present invention.
Figure 11:
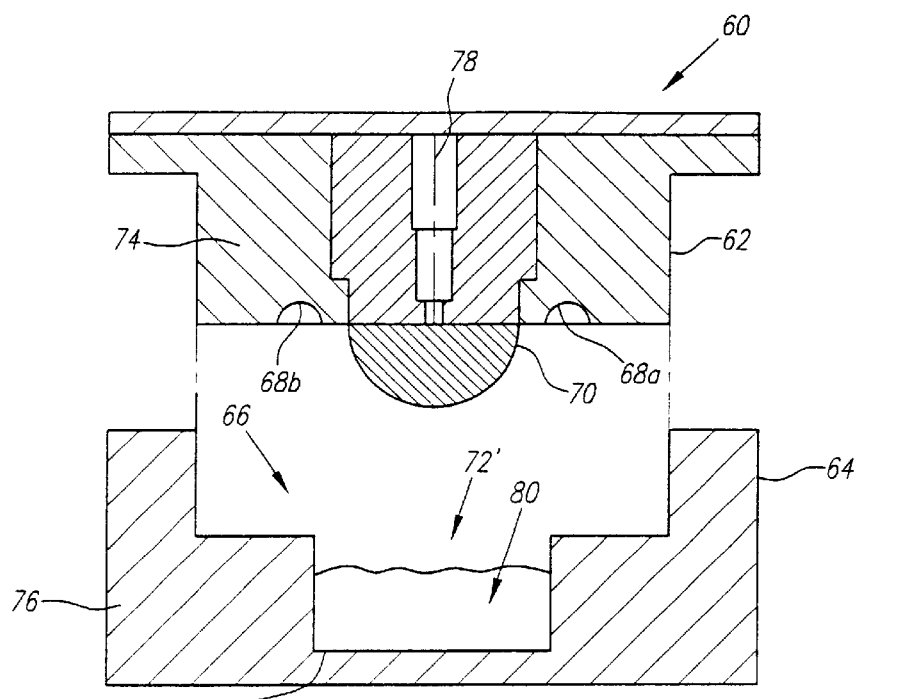
FIG. 11 is a cross-sectional view of a mold utilized to form a plastic insert integral with a plastic supporting cup of the present invention.

An alternative embodiment for forming the replaceable mold cavity 40 is shown in FIG. 10 wherein the plastic insert 20 is formed in the support cup 30. In this embodiment, the recess 72' of the second plate 64 is shaped to accommodate a support cup 30. In this embodiment, the plastic mold material 80 is placed within the recess 32 of the support cup 30. The process is similar to that described above, except the master 70 is mated with the recess 32 of the support cup 30 to form the plastic insert 20. With the plastic insert 20 formed directly on the support cup 30, the need for an adhesive agent between the plastic insert 20 and the support cup 30 may be eliminated allowing for even faster production of a replaceable mold cavity 40.

An embodiment for producing the integral replaceable mold cavity 50 of FIG. 5 is shown in FIG. 1. In this embodiment, the support cup 30 and the plastic insert 20 are integral and of unitary construction. In the present embodiment, the plastic insert 20 and the support cup 30 are molded from a plastic molding material 80 in a unitary construction. Thus, instead of the support cup 30 composed of a metal, the support cup is composed of a plastic molding material. As described above, preferably the plastic molding material is one that exhibits rapid cure time, and upon curing exhibits durability, low wear resistance, and high mechanical strength, particularly at elevated temperatures and pressures. The plastic should also exhibit low and predictable shrinkage during curing. Preferable plastics include thermosetting and thermoplastic resins as described above. Preferred plastic molding materials also include those that are reinforced with filler materials for added strength, as describe above. Most preferable are the phenolic plastic resins with filler materials such as Cytec Fiberite Molding Compound FM-4029F-1 (phenolic resin with glass and mineral fillers) available from Cytec Fiberite, Inc. A replaceable mold cavity 50 of unitary construction for golf ball manufacturing is advantageous because it can be formed more quickly and is less labor intensive to make than mold cavity assemblies utilizing cavity inserts and support cups. Using plastic also makes the mold cavity 50 of unitary construction less expensive than mold cavities or mold cavity assemblies made of metal.

The integral replaceable mold cavity 50 molded from a plastic molding material may be attached to a foundation portion, not shown. The foundation portion is preferably made of a thermally conductive, durable, corrosion and wear-resistant material exhibiting sufficient mechanical strength at the higher temperatures and pressures seen during golf ball molding. A suitable material for the foundation is 300 series stainless steel. Other suitable foundation portion materials readily apparent to one skilled in the art may also be used.

The foundation portion positions and supports the mold cavity 50 provides improved precision in fitting and aligning the mold cavity 50 into a golf ball molding apparatus 97. A foundation portion made of a material exhibiting high thermal conductivity is advantageous because it helps transfer heat energy from the mold 97 to the mold cavity 50. In alternative embodiments, a metal layer 42 may be applied to the inverse dimple pattern 26' of the unitary mold cavity 50 by any of the techniques described herein for forming a metal layer 42.

As shown in FIG. 13, the replaceable mold cavities 40 or 50, are placed within apertures 98 of golf ball molding apparatus 97. The molding apparatus 97 shown is for cast molding a cover on a golf ball precursor product 99. The golf ball precursor product 99 may be a core, or a core with a boundary layer thereon. Although the cast molding operation is shown for use of the replaceable mold cavities 40 or 50, those skilled in the pertinent art will recognize that the replaceable mold cavities 40 or 50 of the present invention may be used with injection molding or compression molding of covers onto a golf ball precursor product.

Figure 14:
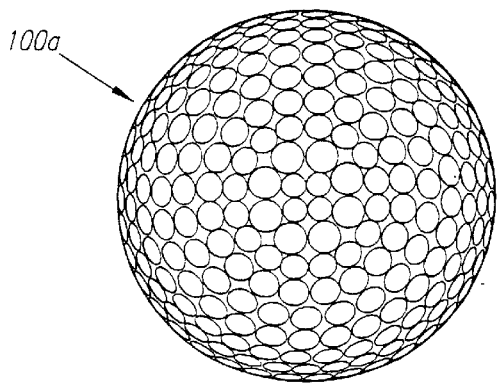
FIG. 14 is a perspective view of a golf ball having a dimple pattern that may be formed using a replaceable mold cavity of the present invention.
Figure 15:
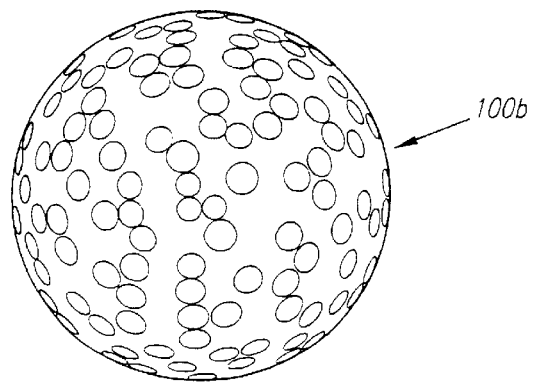
FIG. 15 is a perspective view of an alternative golf ball having another dimple pattern that may be formed using a replaceable mold cavity of the present invention.

As shown in FIGS. 14 and 15, the replaceable mold cavities 40 or 50 of the present invention allow for the rapid production of golf balls 100a and 100b having different dimple patterns thereon. Thus, production costs are lowered, production schedules are accelerated, and new golf balls 100 may be tested and produced faster.

I claim as my invention the following:

1. A method for producing a replaceable mold cavity insert for a golf ball, the method comprising:
   introducing a plastic molding material into a recess attached to a second plate of a mold, the plastic molding material comprising a phenolic material;
   mating a master with the recess, the master having a predetermined dimple pattern for a golf ball, the master attached to a first plate of the mold; and
   compression molding the plastic molding material to form a phenolic insert having an inverse dimple pattern of the golf ball.

2. The method according to claim 1 further comprising placing the plastic molding material into a recess of a support cup, the support cup disposed on the second plate of the mold.

3. The method according to claim 1 further comprising forming a support cup from the plastic molding material, the support cup integral with the plastic insert.

* * * * *